(12) United States Patent
Peterman

(10) Patent No.: US 10,631,530 B1
(45) Date of Patent: Apr. 28, 2020

(54) ICE-FISHING TIP-UP

(71) Applicant: PETERMAN PROJECTS, INC., Sault Ste. Marie, MI (US)

(72) Inventor: Jeffrey R. Peterman, Sault Ste. Marie, MI (US)

(73) Assignee: PETERMAN PROJECTS, INC., Sault Ste. Marie, MI (US)

( * ) Notice: Subject to any disclaimer, the term of this patent is extended or adjusted under 35 U.S.C. 154(b) by 142 days.

(21) Appl. No.: 15/831,604

(22) Filed: Dec. 5, 2017

Related U.S. Application Data (60) Provisional application No. 62/431,029, filed on Dec. 7, 2016.

(51) Int. Cl.
*A01K 97/01* (2006.01)
*A01K 97/10* (2006.01)

(52) U.S. Cl.
CPC .............. *A01K 97/01* (2013.01); *A01K 97/10* (2013.01)

(58) Field of Classification Search
CPC ........ A01K 97/01; A01K 97/10; A01K 97/11; A01K 97/12
See application file for complete search history.

(56) References Cited

U.S. PATENT DOCUMENTS

| | | | |
|---|---|---|---|
| 434,426 A | 8/1890 | Costellow | |
| 2,654,176 A * | 10/1953 | Kachelski | A01K 97/01 43/17 |
| 2,689,426 A | 9/1954 | Baenen | |
| 2,803,912 A | 8/1957 | Kellar | |
| 3,807,078 A | 4/1974 | Bartys | |
| 4,021,958 A | 5/1977 | Snodie | |
| 4,120,111 A | 10/1978 | Young, Jr. | |
| 4,290,222 A * | 9/1981 | McLeod | A01K 91/10 43/15 |
| 4,373,287 A | 2/1983 | Grahl | |
| 4,567,686 A | 2/1986 | Akom | |
| 4,704,816 A | 11/1987 | Kuchar | |
| 5,152,093 A | 10/1992 | Bartys | |
| 5,235,773 A | 8/1993 | Rinehart | |

(Continued)

FOREIGN PATENT DOCUMENTS

CA         1164655 A       4/1984

OTHER PUBLICATIONS

Peterman Projects, Inc., "Disclosure of Prior Art Ice-Fishing Tip-Up", May 30, 2018, 4 pp.

*Primary Examiner* — Richard G Davis
(74) *Attorney, Agent, or Firm* — Kurt L. VanVoorhies (57) ABSTRACT

A rod tip of a spring-biased fishing rod pivoted from a pivot support bracket on the base of an ice-fishing tip-up is biased away from a through-hole in the base. Fishing line from the spool of a controllable-drag reel assembly, routed through an associated line guide, an eye portion of a trigger link, the rod tip, and the through-hole, is attached to a hook. The trigger link engages an intermediate portion of the fishing rod and retains the fishing rod in a cocked condition against the spring bias. A flexible cover provides for covering the associated ice hole and securing the tip-up in a folded condition with the associated spring disengaged. Tension in the fishing line when catching a fish causes the trigger link to release the fishing rod, which is rotationally accelerated sufficiently fast to prevent the fish from swallowing the hook.

9 Claims, 9 Drawing Sheets

(56) References Cited

U.S. PATENT DOCUMENTS

| | | | |
|---|---|---|---|
| 5,987,801 A | 11/1999 | Anderson | |
| 6,050,020 A * | 4/2000 | Sizemore | A01K 97/11 43/15 |
| 6,354,036 B1 | 3/2002 | Carlson et al. | |
| 6,594,941 B1 * | 7/2003 | Anderson | A01K 97/01 43/17 |
| 7,992,341 B1 | 8/2011 | Renstrom | |
| 8,497,778 B1 | 7/2013 | Martin | |

* cited by examiner

ICE-FISHING TIP-UP

CROSS-REFERENCE TO RELATED APPLICATIONS

The instant application claims the benefit of prior U.S. Provisional Application Ser. No. 62/431,029 filed on 7 Dec. 2016, which is incorporated by reference in its entirety.

BRIEF DESCRIPTION OF THE DRAWINGS

In the accompanying drawings:

FIG. 1b illustrates an oblique top-view of a trigger portion of the ice-fishing tip-up illustrated in FIG. 1a;

FIG. 8b illustrates a first orthogonal view of the trigger link illustrated in FIG. 8a; FIG. 8c illustrates a second orthogonal view of the trigger link illustrated in FIG. 8a;

DESCRIPTION OF EMBODIMENT(S)

Referring to FIGS. 1a, 1b, 2 and 3, an ice-fishing tip-up 10 provides for aiding an ice-fisherman in catching a fish from an ice-covered body of water 12 while ice fishing through an ice-hole 14 in the ice 16. The ice-fishing tip-up 10 incorporates a fishing rod 18 that is pivoted at a first end portion 18.1 thereof from a pivot support bracket 20 attached to a top surface 22 of an elongate base 24 proximate to a first end 24.1 thereof. A rod tip 26 attached to a second end portion 18.2 of the fishing rod 18 incorporates a guide 28 through which an end portion 30.1 of fishing line 30 is passed. The end portion 30.1 of the fishing line 30 is terminated in a loop 32, to which a hook, lure or bait 34 is attached either directly, or indirectly—for example, via a swivel (not illustrated). The elongate base 24 incorporates a through-hole 36 through which the end portion 30.1 of the fishing line 30 with hook, lure or bait 34 is passed into the water 12 while ice fishing, wherein the location of the through-hole 36 on the top surface 22 of the elongate base 24 is substantially aligned with the rod tip 26 when the fishing rod 18 is rotationally positioned near the elongate base 24.

Figure 4:
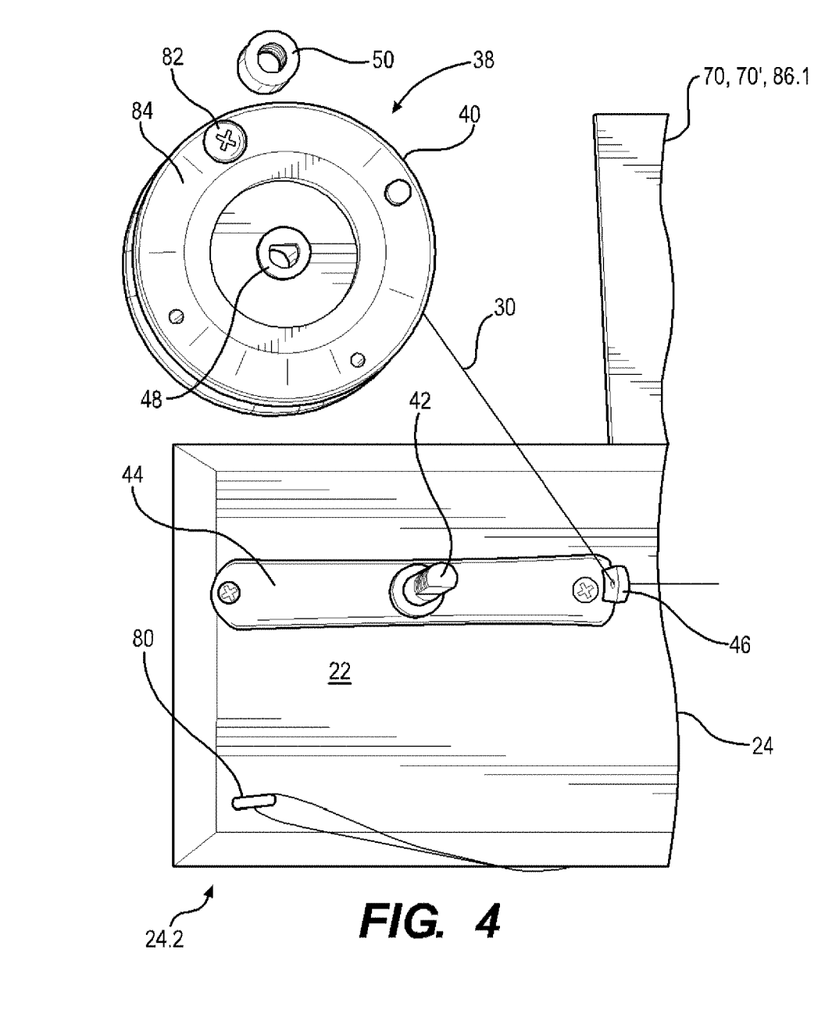
FIG. 4 illustrates a top perspective view of a partially-disassembled second-end portion the first embodiment of the first aspect of the ice-fishing tip-up illustrated in FIG. 3, illustrating elements of an associated reel subassembly.
Figure 5A:
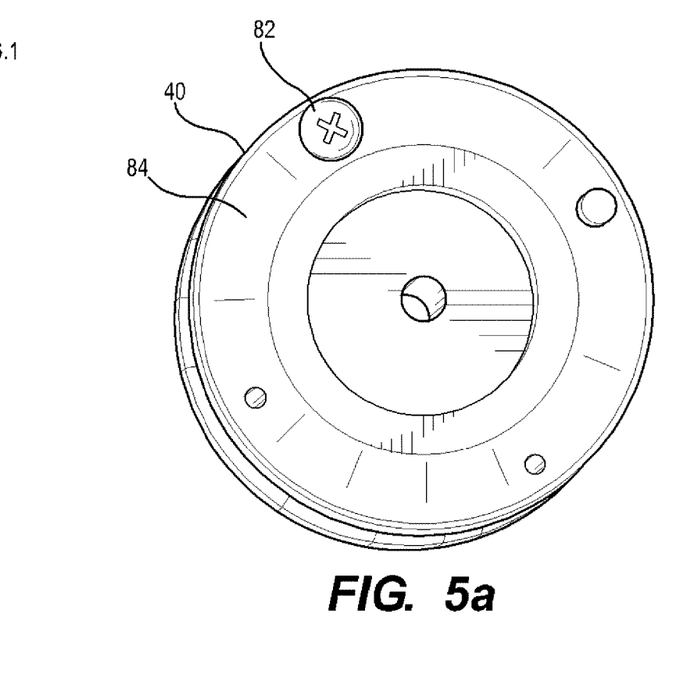
FIG. 5a illustrates a of the reel subassembly illustrated in FIG. 4.
Figure 5B:
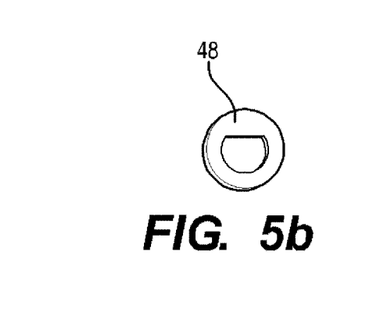
FIG. 5b illustrates a keyed washer of the reel subassembly illustrated in FIG. 4.

Referring also to FIGS. 4, 5a and 5b, the ice-fishing tip-up 10 further incorporates a reel assembly 38 proximate to a second end 24.2 of the elongate base 24. The reel assembly 38 comprises a spool 40 which is rotationally supported by a keyed spool pivot shaft 42 depending from an associated base 44, the latter of which further incorporates a line guide 46. For example, in one set of embodiments, the keyed spool pivot shaft 42, base 44 and line guide 46 are portions of an integral, plastic-molded part. The reel assembly 38 comprises a keyed washer 48 on the keyed spool pivot shaft 42 between a drag-adjusting nut 50 and the top surface 40.1 of the spool 40, wherein the drag-adjusting nut 50 is threaded onto the top end of the keyed spool pivot shaft 42. A supply of the fishing line 30 is wound around spool 40 of the reel assembly 38, which, in cooperation with the drag from the keyed washer 48 and drag-adjusting nut 50, provides for the reel assembly 38 to supply fishing line 30 at controllable drag to the remaining portion of the ice-fishing tip-up 10.

Figure 6:
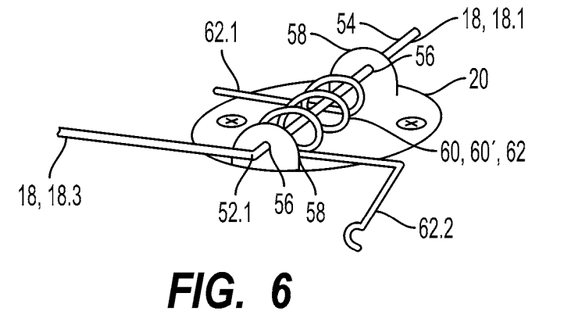
FIG. 6 illustrates a torsional spring subassembly of the first embodiment of the first aspect of the ice-fishing tip-up, with the associated torsional spring disengaged from the associated pole portion of the ice-fishing tip-up, as also illustrated in FIGS. 10-13.
Figure 7:
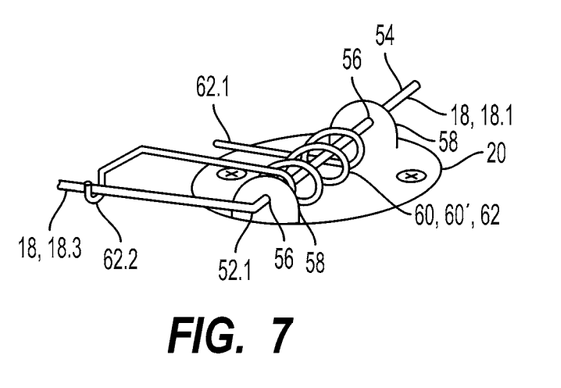
FIG. 7 illustrates the torsional spring subassembly of the first embodiment of the first aspect of the ice-fishing tip-up corresponding to FIG. 6, but with the associated torsional spring engaged with the associated pole portion of the ice-fishing tip-up, as also illustrated in FIGS. 1a, 1b, 2, 3 and 9.

Referring also to FIGS. 6 and 7, in one set of embodiments, the fishing rod 18 is formed from a single, metallic rod, for example, of stainless steel, which is bent at a first bend 52.1—at an oblique or substantially 90 degree angle—so as to form an axle portion 54 of the first end portion 18.1 of the fishing rod 18 and an adjacent first intermediate portion 18.3, and which is bent at second 52.2 and third 52.3 bends—each at substantially 90 degrees—to form a second intermediate portion 18.4 that is oriented substantially transversely to the elongate base 24 and located between the first intermediate portion 18.3 and the second end portion 18.2 of the fishing rod 18. Alternatively, the second end portion 18.2 and first intermediate portion 18.3 could be substantially colinear with respect to one another, with the second intermediate portion 18.4 cantilevered therefrom and torsionally supported thereby, and either with the first end portion 18.1 of similar construction to that described hereinabove, or with the first intermediate portion 18.3 coupled to a stem that is pivotally supported by the pivot support bracket 20. The axle portion 54 of the fishing rod 18 extends through a pair of holes 56 in a corresponding pair of integral side arms 58 of the pivot support bracket 20, wherein, in one set of embodiments, the axle portion 54 of the fishing rod 18 is oriented transversely to elongate base 24, and the transverse location of the pivot support bracket 20 on the elongate base 24 is configured so that the rod tip 26 is substantially transversely aligned with the through-hole 36 in the elongate base 24.

A disengageable spring 60, when engaged between the fishing rod 18 and the pivot support bracket 20, provides for rotationally biasing the fishing rod 18 so that the rod tip 26 is spring-biased away from the through-hole 36. For example, in accordance with a first aspect of the ice-fishing tip-up 10, 10.1, the spring 60, 60' comprises a torsion spring 62 located around the axle portion 54 of the fishing rod 18, between the pair of integral side arms 58 of the pivot support bracket 20. A tangentially-extending first end 62.1 of the torsion spring 62 acts against either the top surface 22 of the elongate base 24 or against a top surface of the pivot support bracket 20, and a second end 62.2 of the torsion spring 62 is hook-shaped so as to provide for engaging a first intermediate portion 18.3 of the fishing rod 18, and so as to provide for being selectively disengaged therefrom.

Figure 8A:
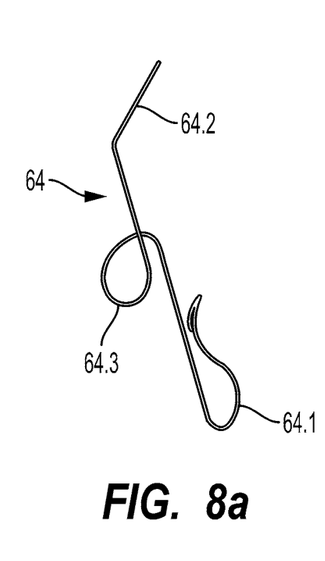
FIG. 8a illustrates an isometric view of the trigger link of the ice-fishing tip-up illustrated in FIGS. 1-3 and 9-13.
Figures 8B, 8C:
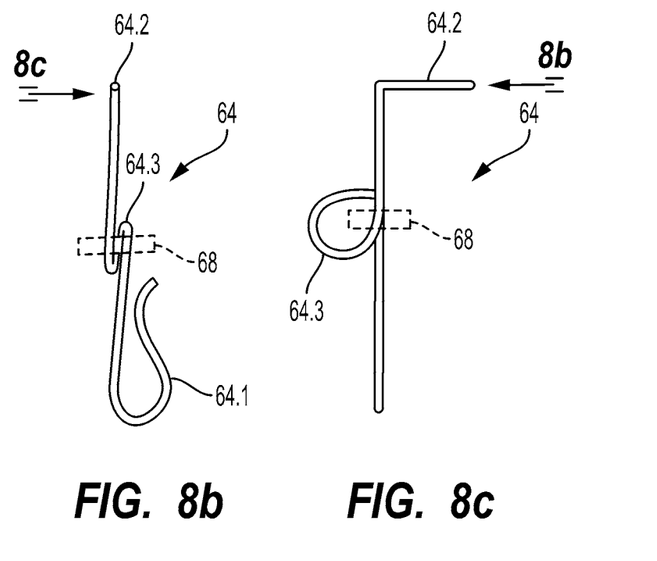

Referring also to FIGS. 8a-8c, the ice-fishing tip-up 10 incorporates a trigger link 64, wherein a lower, clip portion 64.1 thereof is operatively coupled to a screw-eye 66 attached to the elongate base 24. An upper, arm portion 64.2 of the trigger link 64 provides for engaging the second intermediate portion 18.4 of the fishing rod 18. When the arm portion 64.2 of the trigger link 64 is engaged with the second intermediate portion 18.4 of the fishing rod 18, the trigger link 64 provides for restraining the fishing rod 18 in a cocked position, against the bias torque of the spring 60 when the latter is engaged between the fishing rod 18 and the pivot support bracket 20, as illustrated in FIGS. 1a-b, 2 and 3. The trigger link 64 incorporates an integrally-formed intermediate eye portion 64.3, which is adapted to receive the fishing line 30 therethrough. For example, in one set of embodiments, the trigger link 64 is formed from a single wire or rod, for example, of stainless steel, with the intermediate eye portion 64.3 formed as a loop of one or more turns, with the arm 64.2 and intermediate eye 64.3 portions substantially along a first plane that is substantially aligned with the length of the elongate base 24, and with the clip portion 64.1 substantially along a second plane that is substantially normal to the first plane. Referring to FIGS. 2, 8b and 8c, in one set of embodiments, the loop of the intermediate eye portion 64.3 is closed with a wire tie 68 or other closure.

The ice-fishing tip-up 10 further incorporates a flexible cover 70, for example, a rubberized or vinyl-coated fabric 70', which is sufficiently large and sufficiently stiff to provide for covering the ice-hole 14 and preventing snow buildup therein when the flexible cover 70 is fully extended, and which is sufficiently large and sufficiently flexible to provide for wrapping around and partially covering the elongate base 24 and folded fishing rod 18 of the ice-fishing tip-up 10 for storage or travel as more fully described hereinbelow.

Figure 1A:
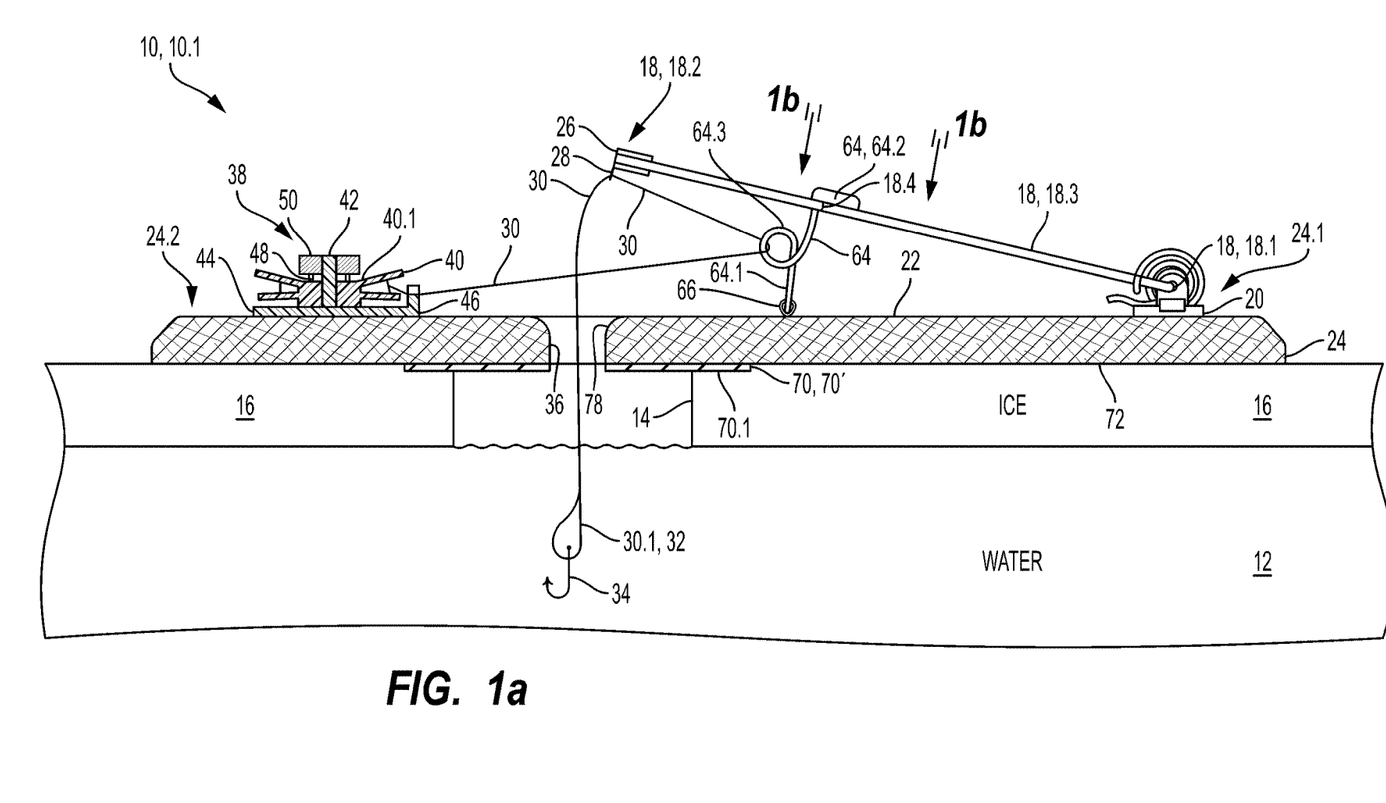
FIG. 1a illustrates a side cross-sectional view of a first aspect of an ice-fishing tip-up in a cocked configuration above an ice hole while ice fishing.
Figure 1B:
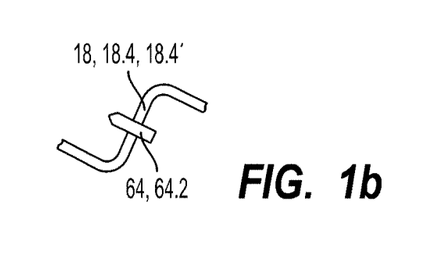
Figure 2:
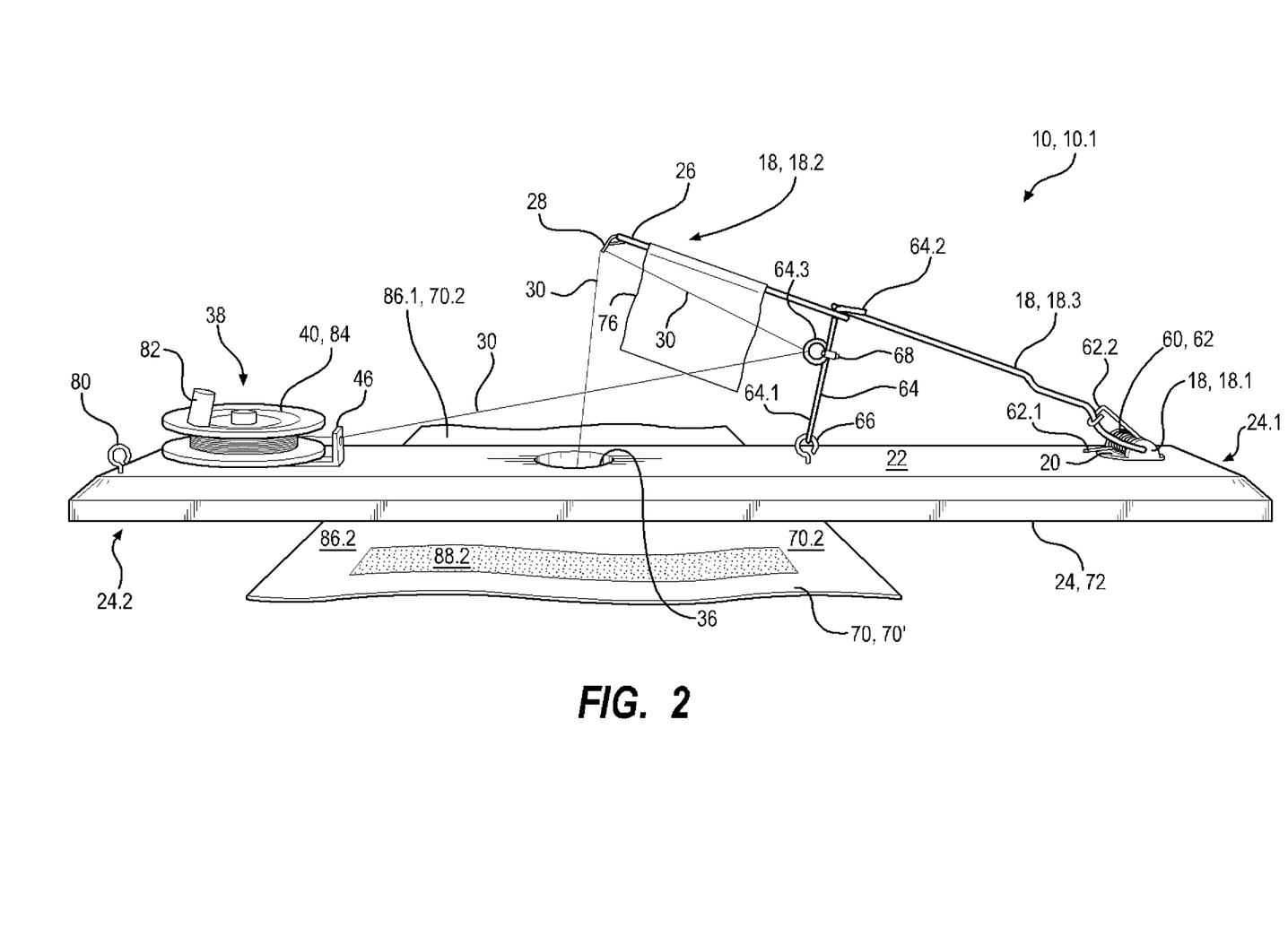
FIG. 2 illustrates a side perspective view of a first embodiment of the first aspect of the ice-fishing tip-up in a cocked configuration.

Referring to FIGS. 1a-b, 2, 3 and 7, in operation of the ice-fishing tip-up 10, 10.1, the second end 62.2 of the torsion spring 62 is engaged with the first intermediate portion 18.3 of the fishing rod 18 so as to provide for biasing the rod tip 26 of the fishing rod 18 away from the through-hole 36 of the elongate base 24. The fishing line 30 is routed from the spool 40 of the reel assembly 38, through a hole in the associated line guide 46, then through the intermediate eye portion 64.3 of the trigger link 64, then through the guide 28 of the rod tip 26, and finally—with the hook, lure or bait 34 secured to the loop 32 on the end portion 30.1 of fishing line 30—through the through-hole 36 in the elongate base 24. With the rod tip 26 of the fishing rod 18 manually rotated towards the through-hole 36 against the bias torque of the spring 60, 60', the arm portion 64.2 of the trigger link 64 is engaged with the second intermediate portion 18.4 of the fishing rod 18 so as to provide for restraining the fishing rod 18 in a cocked position, ready to catch a fish, with the flexible cover 70 extended on both sides of the elongate base 24 so as to provide for covering the ice-hole 14, with the through-hole 36 in the elongate base 24 located over the ice-hole 14, and with the base surface 72 of the elongate base 24 flat against the top surface of the ice 16. As illustrated in FIG. 1b, in one set of embodiments, the top surface 18.4' of the second intermediate portion 18.4 of the fishing rod 18 is flattened so as to facilitate engagement with the arm portion 64.2 of the trigger link 64, although this is not essential.

Figure 9:
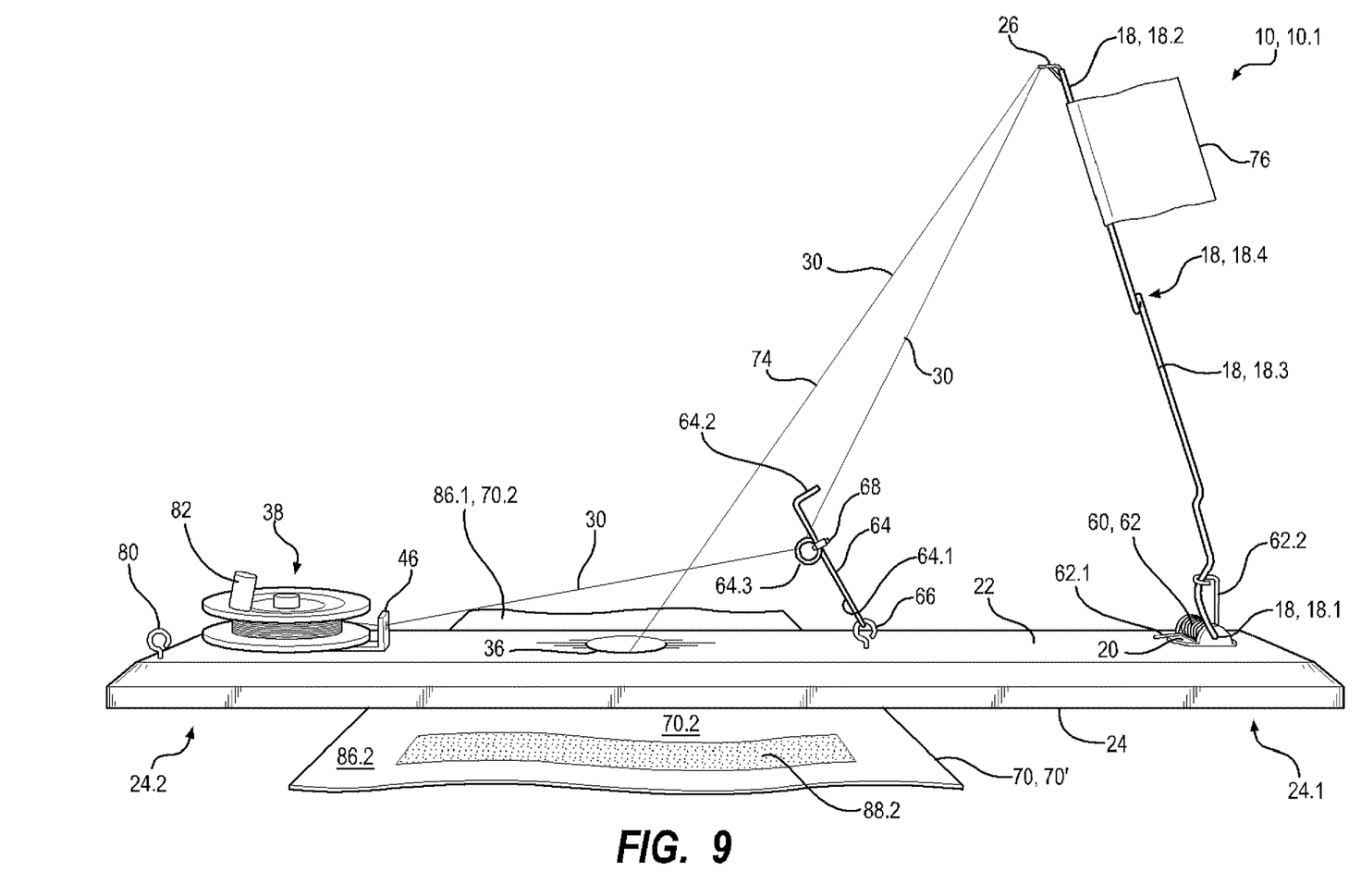
FIG. 9 illustrates a side perspective view of the first embodiment of the first aspect of the ice-fishing tip-up in a triggered configuration.

Referring to FIG. 9, with sufficient drag on the spool 40 of the reel assembly 38 by the associated drag-adjusting nut 50, a fish biting the hook, lure or bait 34 and pulling on the fishing line 30 with sufficient force will cause sufficient tension in the fishing line 30 to generate sufficient force to pull on intermediate eye portion 64.3 of the trigger link 64 and release the arm portion 64.2 thereof from engagement with the second intermediate portion 18.4 of the fishing rod 18, thereby enabling the bias torque from the spring 60, 60' to rotationally accelerate the fishing rod 18, and thereby accelerate the rod tip 26 thereof away from the through-hole 36 in elongate base 24, thereby taking up slack in the fishing line 30 and applying a force against the fish. The length of the fishing rod 18 is sufficient so that the chordal distance 74 of travel from the cocked position illustrated in FIGS. 1a, 2 and 3 to the triggered position illustrated in FIG. 9 is sufficient to take up the expected slack in the fishing line 30 and thereby prevent the fish from releasing the hook, lure or bait 34. Furthermore, the length of the length of the fishing rod 18 in combination with the torque profile of the spring 60, 60' is sufficient to accelerate the hook, lure or bait 34 sufficiently fast to prevent the fish from swallowing the hook, lure or bait 34, so that the fish may be caught and released without endangering the fish. For example, in one set of embodiments, the pivoted length of the fishing rod 18 is about 12 inches (30.5 cm). The fishing rod 18 incorporates a flag 76 proximate to the second end portion 18.2 thereof so as to provide for signaling to the fisherman that the ice-fishing tip-up 10 has been triggered. The drag on the fishing line 30 may be adjusted with the drag-adjusting nut 50, wherein the keying of the keyed washer 48 to keyed spool pivot shaft 42—for example, by flats on the shaft and in the washer—prevents the rotation of the spool 40 from rotating the drag-adjusting nut 50.

The elongate base 24 is sufficiently long to accommodate the fishing rod 18 and reel assembly 38, to span the anticipated largest-diameter ice-hole 14 sufficiently far so as to remain stable for all relative positions of the through-hole 36 relative to the ice-hole 14, and to be sufficiently wide and sufficiently heavy so as to not be blown over in the wind under expected wind conditions; yet sufficiently light weight to be easily carried, or moved from the ice-hole 14 when landing a fish. The through-hole 36 in the elongate base 24 is sufficiently large to accommodate the maximum expected size of the hook, lure or bait 34 and to provide for inspecting the ice-hole 14 for the condition of the hook, lure or bait 34, yet sufficiently small to prevent the ice-hole 14 from either freezing up or filling with snow. For example, in one set of embodiments, the elongate base 24 is constructed from a piece of wood, about 23 inches (58.4 cm) long and about 4.3 inches (10.9 cm) wide, and the through-hole 36 is about 1.5 inches (38 mm) in diameter. Alternatively, the elongate base 24 could be constructed of plastic or metal, or a hybrid thereof, of sufficient size and weight to provide for the above-described functionality. The top edge of the through-hole 36 is rounded 78 so as to provide a smooth surface for the fishing line 30.

Figure 3:
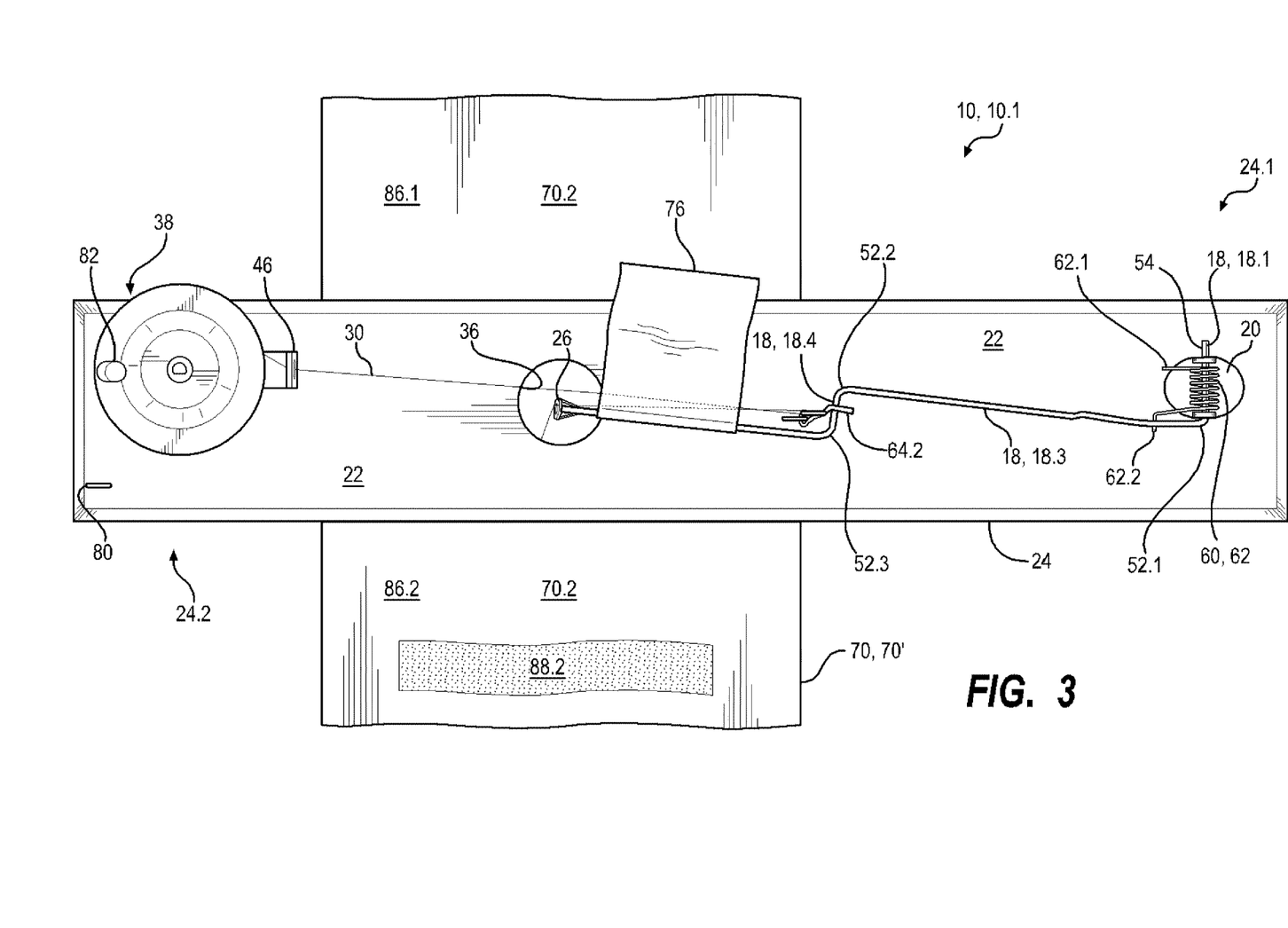
FIG. 3 illustrates a top perspective view of the first embodiment of the first aspect of the ice-fishing tip-up in the cocked configuration illustrated in FIG. 2.

Referring to FIGS. 3 and 4, the reel assembly 38, and particularly the line guide 46 thereof, is laterally offset on the top surface 22 of the elongate base 24 relative to the rod tip 26 of the fishing rod 18, so that the portion of the fishing line 30 between the line guide 46 and the intermediate eye portion 64.3 of the trigger link 64 is laterally offset relative to the portion of the fishing line 30 from the guide 28 of the rod tip 26 to the through-hole 36, so as to prevent interference between the respective portions of the fishing line 30, and so as to provide for the fisherman to manually retract the fishing line 30 and hook, lure or bait 34 towards the through-hole 36 to inspect the condition of the hook, lure or bait 34, without triggering the ice-fishing tip-up 10, 10.1.

Figure 10:
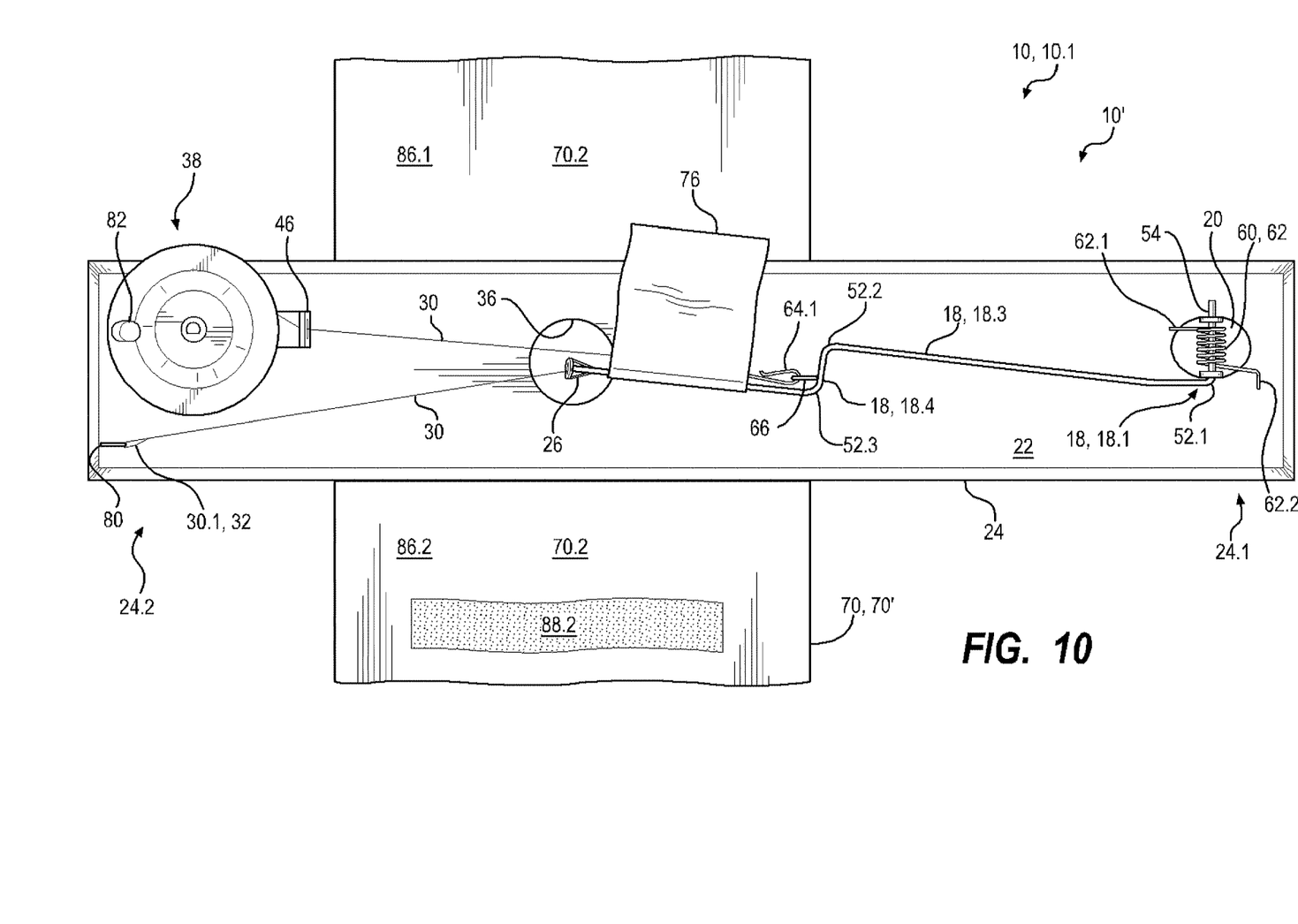
FIG. 10 illustrates a top perspective view of the first embodiment of the first aspect of the ice-fishing tip-up in a folded configuration, with the associated torsional spring disengaged from the associated pole portion, as further illustrated in FIG. 6.

Referring to FIGS. 6 and 10, after ice fishing is finished, the ice-fishing tip-up 10, 10.1 is packed for travel by first releasing the second end 62.2 of the torsion spring 62 from engagement with the first intermediate portion 18.3 of the fishing rod 18, then hooking either the loop 32 at the end portion 30.1 of fishing line 30, or the hook, lure or bait 34, to a second screw-eye 80 fastened to the elongate base 24 proximate to the second end 24.2. Then, the remaining slack in the fishing line 30 is reeled onto the spool 40 of the reel assembly 38, for example, with the aid of a handle 82 attached to, or a part of, the top side of the spool 40 near the rim 84 thereof, with the drag-adjusting nut 50 adjusted as necessary to release the drag on the fishing line 30, after which the drag-adjusting nut 50 may be tightened to prevent the fishing line 30 from unspooling from the spool 40; thereby resulting in a folded ice-fishing tip-up 10' that is ready for packing.

Figure 11:
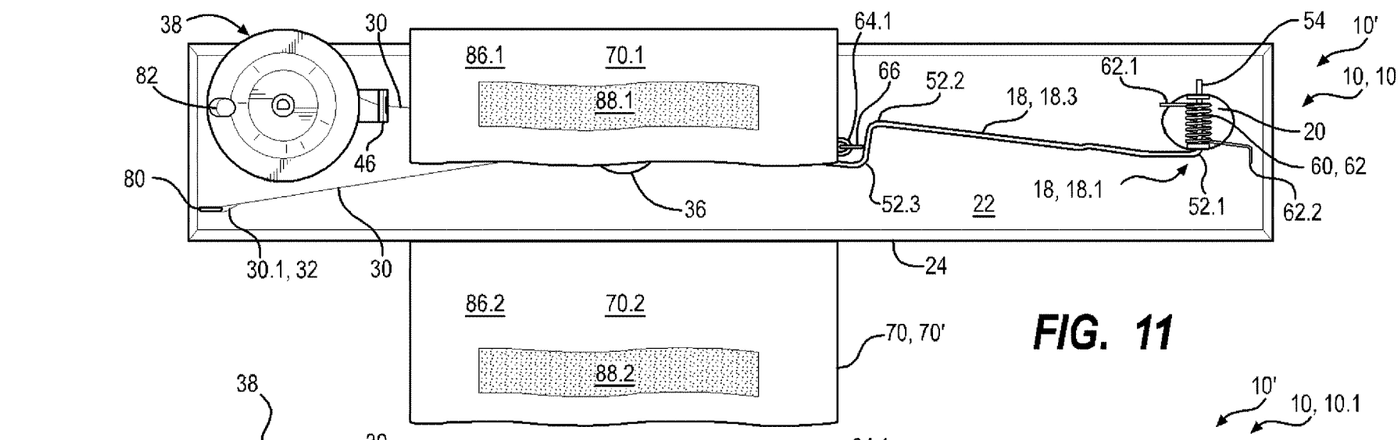
FIG. 11 illustrates a top perspective view of the first embodiment of the first aspect of the ice-fishing tip-up in a folded configuration, with a first flap portion of an associated ice-hole cover flap partially folded over a portion of the ice-fishing tip-up.
Figure 12:
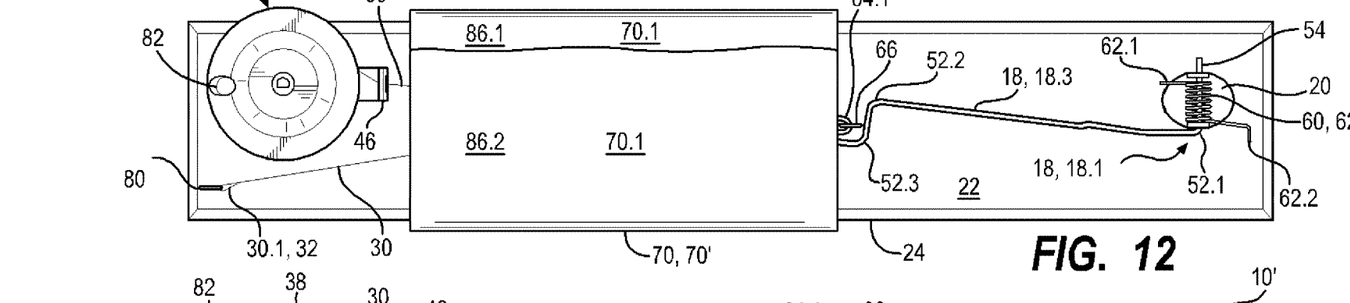
FIG. 12 illustrates a top perspective view of the first embodiment of the first aspect of the ice-fishing tip-up in a folded and packed configuration, with a second flap portion of the associated ice-hole cover flap folded and secured over the first flap potion and over the portion of the ice-fishing tip-up illustrated in FIG. 11.
Figure 13:
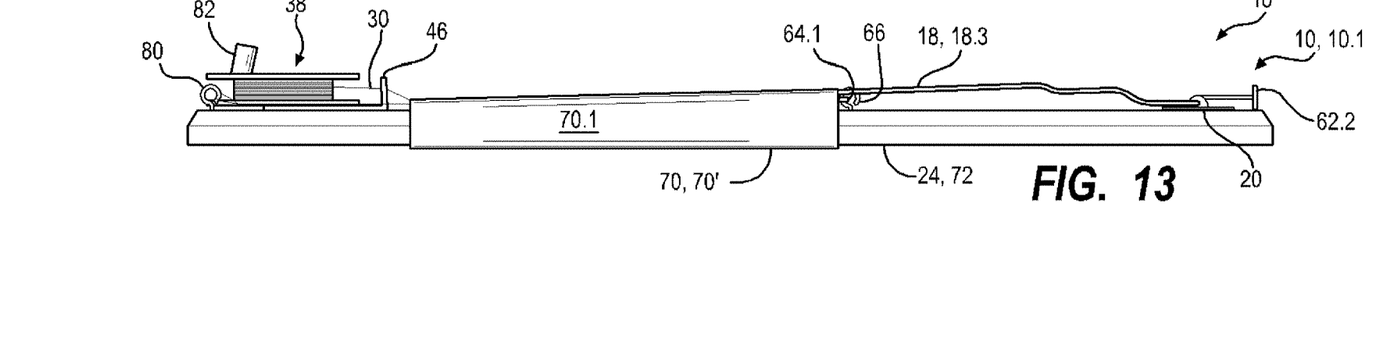
FIG. 13 illustrates a side perspective view of the first embodiment of the first aspect of the ice-fishing tip-up in a folded and packed configuration, with the associated ice-hole cover flap folded and secured over a portion of the ice-fishing tip-up, corresponding to FIG. 12.

Then, referring to FIG. 11, a first flap portion 86.1. of the flexible cover 70 is folded over the folded ice-fishing tip-up 10', thereby exposing a first mating portion of Velcro® strip 88.1 on a bottom surface 70.1 of the flexible cover 70 that provides for connectably mating with a corresponding second mating portion of Velcro® strip 88.2 on the top surface 70.2 of a second flap portion 86.2 of the flexible cover 70. Then, referring to FIGS. 12 and 13, the second flap portion 86.2 is folded over the first flap portion 86.1, so as to provide for connecting the first 88.1 and second 88.2 mating portions of Velcro® strip to one another, thereby maintaining the folded ice-fishing tip-up 10' in a folded condition.

Figure 14:
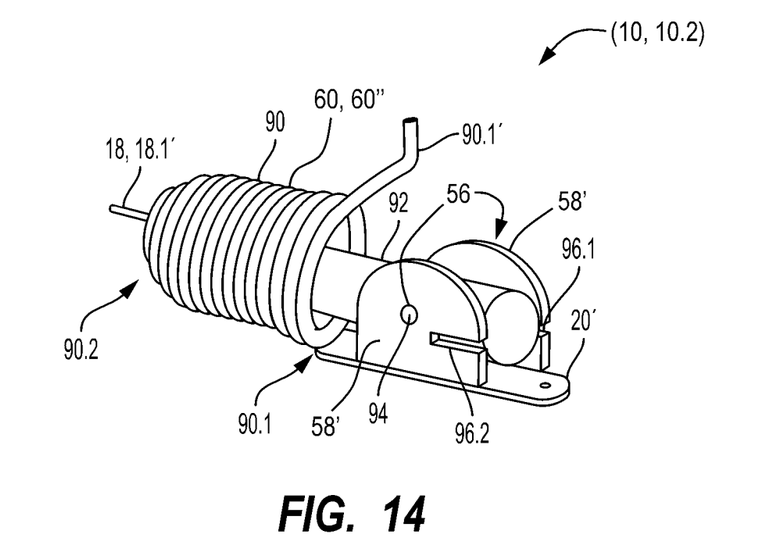
FIG. 14 illustrates an alternative spring subassembly of a second aspect of an ice-fishing tip-up, with the associated spring disengaged from the associated pivot support bracket.
Figure 15:
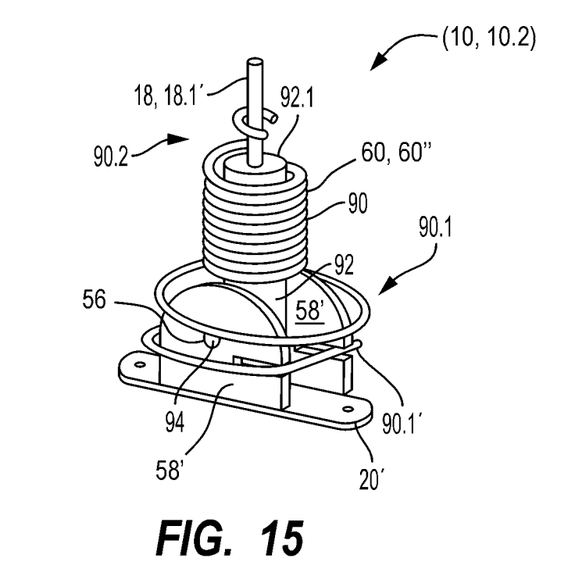
FIG. 15 illustrates the alternative spring subassembly of the second aspect of an ice-fishing tip-up corresponding to FIG. 14, but with the associated spring engaged with the associated pivot support bracket.

Referring to FIGS. 14 and 15, a second aspect of an ice-fishing tip-up 10, 10.2 is same as the above-described first aspect of the ice-fishing tip-up 10, 10.1, except for the nature of the associated spring 60, 60", and the manner in which the fishing rod 18 is operatively coupled to and pivoted from the associated pivot support bracket 20'. In both aspects 10.1, 10.2, the fishing rod 18 remains operatively (i.e. pivotally) coupled to the pivot support bracket 20, 20' regardless of the state of engagement of the associated spring 60, 60', 60". However, whereas the first aspect of the ice-fishing tip-up 10, 10.1 incorporates a torsion spring 62 that may be coupled to, or decoupled from, the fishing rod 18, the second aspect of the ice-fishing tip-up 10, 10.2 incorporates a coil spring 90 that may be coupled to, or decoupled from, the pivot support bracket 20', wherein the coil spring 90 located around a first end portion 18.1' of the fishing rod 18, or around an associated rod base 92 to which the first end portion 18.1' of the fishing rod 18 is operatively coupled, wherein the rod base 92 is operatively coupled to the pivot support bracket 20' with an associated axle shaft 94 that extends through the pair of holes 56 in the side arms 58' of the pivot support bracket 20', and extends through a corresponding transverse hole (not visible) in the rod base 92. The base portion 90.1 of the coil spring 90 extends around the pivot support bracket 20', and lower end 90.1' of the coil spring 90 is configured to engage with one or both slots 96.1, 96.2 in the side arms 58' of the pivot support bracket 20'. Referring to FIG. 14, when the lower end 90.1' of the coil spring 90 is disengaged with the slots 96.1, 96.2 in the side arms 58' of the pivot support bracket 20', the coil spring 90 does not generate a biasing torque on the fishing rod 18, thereby providing for the ice-fishing tip-up 10, 10.2 to be packed, similar to the manner illustrated in FIGS. 10-13. Referring to FIG. 15, when the lower end 90.1' of the coil spring 90 is engaged one or both of the slots 96.1, 96.2 in the side arms 58' of the pivot support bracket 20', the coil spring 90 provides for generating a biasing torque on the fishing rod 18 responsive to a rotational displacement of the fishing rod 18 from vertical. The top portion 90.2 of the coil spring 90 is wound relatively tighter than the remaining portion of the coil spring so as to provide for engaging the top 92.1 of the rod base 92 when the fishing rod 18 is upright, thereby contributing to the extension of the coil spring 90 and a resulting associated biasing torque by the coil spring 90 on the fishing rod 18 when the fishing rod 18 is rotated. Alternatively, the base portion 90.1 of the coil spring 90 could be located between the side arms 58' of the pivot support bracket 20', with the lower end 90.1' of the coil spring 90 adapted to cooperate a slot 96.1 in one of the side arms 58'. Yet further alternatively, the pivot support bracket could incorporate a single arm that engages a corresponding slot in the base of the rod base 92, with the lower end 90.1' of the of the coil spring 90 adapted to cooperate with a single slotted portion depending from the associated pivot support bracket.

While specific embodiments have been described in detail in the foregoing detailed description and illustrated in the accompanying drawings, those with ordinary skill in the art will appreciate that various modifications and alternatives to those details could be developed in light of the overall teachings of the disclosure. It should be understood, that any reference herein to the term "or" is intended to mean an "inclusive or" or what is also known as a "logical OR", wherein when used as a logic statement, the expression "A or B" is true if either A or B is true, or if both A and B are true, and when used as a list of elements, the expression "A, B or C" is intended to include all combinations of the elements recited in the expression, for example, any of the elements selected from the group consisting of A, B, C, (A, B), (A, C), (B, C), and (A, B, C); and so on if additional elements are listed. Furthermore, it should also be understood that the indefinite articles "a" or "an", and the corresponding associated definite articles "the" or "said", are each intended to mean one or more unless otherwise stated, implied, or physically impossible. Yet further, it should be understood that the expressions "at least one of A and B, etc.", "at least one of A or B, etc.", "selected from A and B, etc." and "selected from A or B, etc." are each intended to mean either any recited element individually or any combination of two or more elements, for example, any of the elements from the group consisting of "A", "B", and "A AND B together", etc. Yet further, it should be understood that the expressions "one of A and B, etc." and "one of A or B, etc." are each intended to mean any of the recited elements individually alone, for example, either A alone or B alone, etc., but not A AND B together. Furthermore, it should also be understood that unless indicated otherwise or unless physically impossible, that the above-described embodiments and aspects can be used in combination with one another and are not mutually exclusive. Accordingly, the particular arrangements disclosed are meant to be illustrative only and not limiting as to the scope of the invention, which is to be given the full breadth the appended claims, and any and all equivalents thereof

What is claimed is:

1. A method of ice fishing, comprising:
   a. pivoting a fishing rod from an elongate base, wherein a first end of said fishing rod is pivoted from a top side of said elongate base proximate to a first end thereof, a second end of said fishing rod incorporates a fishing-line guide, and said elongate base incorporates a through-hole from said top side thereof to a bottom side thereof, wherein said bottom side is opposite to said top side, and said through-hole is located under said first end of said fishing rod when said fishing rod is pivoted against said elongate base;
   b. selectively applying or removing a spring-bias force between said elongate base and said fishing rod pivoted from said elongate base, wherein said spring-bias force on said fishing rod relative to said elongate base can be released without disconnecting said fishing rod from said elongate base;
   c. supplying fishing line from a reel assembly operatively coupled to said elongate base proximate to a second end thereof, wherein said reel assembly comprises a spool and a drag-adjusting element, said spool provides for supplying said fishing line, and said drag-adjusting element provides for adjusting the amount of force on said fishing line needed to unspool said fishing line from said spool; and
   d. pivoting a trigger link from said elongate base, wherein said trigger link incorporates an arm portion that cooperates with a transversely-oriented portion of said fishing rod to provide for engaging with and retaining said fishing rod in a first rotational position by which said first end thereof is biased towards said through-hole, said transversely-oriented portion is oriented transverse to a plane of rotation of said fishing rod, said trigger link incorporates an intermediate eye portion that is adapted to receive said fishing line from said reel assembly, and a force on said intermediate eye portion from said fishing line, when said fishing line is threaded through said intermediate eye portion, provides for releasing said arm portion from engagement with said transversely-oriented portion of said fishing rod so as to provide for said fishing rod to rotate away from said through-hole responsive to said spring-bias force.

2. A method of ice fishing as recited in claim 1, wherein said first end of said fishing rod is bent relative to an adjacent portion of said fishing rod so as to form an axle portion at said first end of said fishing rod, and said axle portion is pivoted from a pair of laterally separated arms of a pivot support bracket attached to said top side of said elongate base proximate to said first end thereof.

3. A method of ice fishing as recited in claim 2, wherein said spring-bias force is provided by a torsion spring that is coiled about said axle portion of said fishing rod, a first end of said torsion spring is operative against either said elongate base or said pivot support bracket, a second end of said torsion spring is operative against said fishing rod, and said second end of said torsion spring is disconnectable from said fishing rod so as to provide for releasing said spring-bias force.

4. A method of ice fishing as recited in claim 1, further comprising extending first and second flap portions of a flexible cover beyond corresponding opposing longitudinal edges of said elongate base so as to provide for covering a top of an ice hole above which said elongate base is to be placed when fishing.

5. A method of ice fishing as recited in claim 4, wherein said flexible cover depends from said bottom side of said elongate base.

6. A method of ice fishing as recited in claim 1, wherein the operation of selectively applying or removing said spring-bias force between said elongate base and said fishing rod comprises removing said spring-bias force by releasing an end of an associated spring from engagement with said fishing rod, wherein said associated spring is operative between said fishing rod and said elongate base, further comprising:
   a. rotating said fishing rod relative to said elongate base to a second rotational position by which said second end of said fishing rod is proximate to said top side of said elongate base;
   b. folding a first flap portion of a flexible cover over said fishing rod rotated in said second rotational position so as to cause a top surface of said first flap portion of said flexible cover to abut said fishing rod, wherein said first flap portion of said flexible cover laterally extends laterally beyond a first longitudinal edge of said elongate base;
   c. folding a second flap portion of said flexible cover over said first flap portion of said flexible cover causing a top surface of said second flap portion of said flexible cover to abut a bottom surface of said first flap portion of said flexible cover, wherein said second flap portion of said flexible cover laterally extends beyond a second longitudinal edge of said elongate base, and first and second longitudinal edges of said elongate base are opposite one another.

7. A method of ice fishing as recited in claim 6, further comprising securing said first and second flap portions of said flexible cover to one another with at least one pair of fasteners operative therebetween.

8. A method of ice fishing as recited in claim 6, wherein said at least one pair of fasteners operative between said first and second flap portions of said flexible cover comprise at least one pair of Velcro®-style fasteners.

9. A method of ice fishing as recited in claim 6, wherein said flexible cover depends from said bottom side of said elongate base.

* * * * *

UNITED STATES PATENT AND TRADEMARK OFFICE
CERTIFICATE OF CORRECTION

PATENT NO. : 10,631,530 B1
APPLICATION NO. : 15/831604
DATED : April 28, 2020
INVENTOR(S) : Jeffrey R. Peterman Page 1 of 1

It is certified that error appears in the above-identified patent and that said Letters Patent is hereby corrected as shown below:

On the Title Page
Item (56), References Cited:
For U.S. PATENT DOCUMENT 2,654,176, replace "Kachelski" with --Kachelski et al.--.

In the Specification
Column 1, Line 29, insert --spool-- before "of";
Column 6, Line 1, insert a space before "regardless"; and
Column 7, Line 19, insert a --.-- after "thereof".

Signed and Sealed this
Ninth Day of June, 2020

Andrei Iancu
*Director of the United States Patent and Trademark Office*